United States Patent [19]
Dai

[11] Patent Number: 5,729,629
[45] Date of Patent: Mar. 17, 1998

[54] HANDWRITTEN SYMBOL RECOGNIZER

[75] Inventor: Xiwei Dai, Bellevue, Wash.

[73] Assignee: Microsoft Corporation, Redmond, Wash.

[21] Appl. No.: 744,218

[22] Filed: Nov. 18, 1996

Related U.S. Application Data

[63] Continuation of Ser. No. 452,660, May 25, 1995, abandoned, which is a continuation of Ser. No. 86,333, Jun. 30, 1993, abandoned.

[51] Int. Cl.$^6$ .............................. G06K 9/00; G06K 9/48
[52] U.S. Cl. ..................... 382/187; 382/197; 382/198; 382/159
[58] Field of Search .............................. 382/119, 159, 382/160, 187, 197, 253, 198

[56] References Cited

U.S. PATENT DOCUMENTS

| | | | |
|---|---|---|---|
| 3,979,722 | 9/1976 | Sakoe | 382/13 |
| 4,365,235 | 12/1982 | Greanias et al. | 382/13 |
| 4,542,526 | 9/1985 | Satoh et al. | 382/13 |
| 4,628,532 | 12/1986 | Stone et al. | 382/21 |
| 4,630,309 | 12/1986 | Karow | 382/56 |
| 4,653,107 | 3/1987 | Shojima et al. | 382/13 |
| 4,672,677 | 6/1987 | Yamakawa | 382/13 |
| 4,680,804 | 7/1987 | Kuzunuki et al. | 382/13 |
| 4,680,805 | 7/1987 | Scott | 382/22 |
| 4,685,142 | 8/1987 | Ooi et al. | 382/13 |
| 4,701,960 | 10/1987 | Scott | 382/3 |
| 4,718,103 | 1/1988 | Shojima et al. | 382/13 |
| 4,979,226 | 12/1990 | Sato | 382/21 |
| 4,987,603 | 1/1991 | Ohnishi et al. | 382/25 |
| 5,007,098 | 4/1991 | Kumagai | 382/21 |
| 5,113,452 | 5/1992 | Chatani et al. | 382/13 |
| 5,121,442 | 6/1992 | Togawa et al. | 382/13 |
| 5,151,950 | 9/1992 | Hullender | 382/13 |
| 5,265,174 | 11/1993 | Nakatsuka | 382/13 |

FOREIGN PATENT DOCUMENTS

| | | | |
|---|---|---|---|
| 0 183 347 | 6/1986 | European Pat. Off. | G06K 9/62 |

OTHER PUBLICATIONS

Gonzalez, *Digital Image Processing*, Addison Wesley, (1992).

(List continued on next page.)

*Primary Examiner*—Jose L. Couso
*Assistant Examiner*—Matthew C. Bella
*Attorney, Agent, or Firm*—Seed and Berry LLP

[57] ABSTRACT

A handwritten symbol recognizer adapted to automatically recognize various handwritten symbols including Kanji character is disclosed. The symbol recognizer includes a data processor coupled to a user interface that receives handwritten input symbols from a user and displays reference symbols determined by the symbol recognizer to correspond to the handwritten symbols. The data processor includes a memory unit which temporarily stores coordinate information representing features of the input symbols as received from the user interface. The data processor includes a symbol analyzer that retrieves the coordinate information from the memory unit and translates the coordinate information for each written feature into a feature code representing one of a predetermined number of feature models stored in the memory. The symbol analyzer also creates a geometric representation of the input symbol for comparison with one or more geometric models stored in the memory unit. The data processor also includes a label comparator adapted to compare the feature codes for the input symbol with feature codes of reference symbols stored in the memory unit and to identify the reference symbol or symbols having feature codes that most closely match the feature codes of the input symbol. The data processor also includes a geometric comparator that compares stored geometric models corresponding to the reference symbols most closely matching the input label with the geometric representation of the input symbol. The geometric comparator uses its comparison to identify the reference symbols whose geometric model or models most closely match the geometric representation of the input symbol. The reference symbol that most closely matches the handwritten input symbol, as determined by the label and geometric comparators, is sent to the user interface which displays the reference symbol to the user.

61 Claims, 4 Drawing Sheets

OTHER PUBLICATIONS

Ye, Qin–Zhong, "The Signed Euclidean Distance Transform and Its Application", IEEE, 1988, pp. 495–499.

Charles C. Tappert et al., "The State of the Art In On–Line Handwriting Recognition," vol. 12, No. 8, Aug. 1990, 787–808.

Kerrick and Bovik, "Microprocessor–Based Recognition of Handprinted Characters From a Tablet Input," *Pattern Recognition* 21(5):525–537, 1988.

"Method for Supporting Stroke Variations In Online Handwritten Character Recognition," in *IBM Technical Disclosure Bulletin* 35(5):358–359, Oct. 1992.

Ikeda et al., "On–Line Recognition of Hand–Written Characters Utilizing Positional and Stroke Vector Sequences," in *Proceedings of the Fourth International Joint Conference on Pattern Recognition*, Kyoto, Japan, Nov. 7–10, 1978, pp. 813–815.

MODEL FEATURES

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 10 | 0 | 7 | 7 | 1 | 1 | 0 | 0 | 0 | 10 | 0 | 7 | 7 | 1 | 1 | 0 |
| 1 | 0 | 10 | 7 | 7 | 1 | 1 | 0 | 0 | 0 | 0 | 10 | 7 | 7 | 1 | 1 | 0 |
| 2 | 7 | 7 | 10 | 0 | 1 | 1 | 0 | 0 | 0 | 7 | 7 | 10 | 0 | 1 | 1 | 0 |
| 3 | 7 | 7 | 0 | 10 | 1 | 1 | 0 | 0 | 0 | 7 | 7 | 0 | 10 | 1 | 1 | 0 |
| 4 | 1 | 1 | 1 | 1 | 10 | 1 | 7 | 0 | 0 | 1 | 1 | 1 | 1 | 10 | 1 | 0 |
| 5 | 1 | 1 | 1 | 1 | 1 | 10 | 0 | 0 | 0 | 1 | 1 | 1 | 1 | 1 | 10 | 0 |
| 6 | 0 | 0 | 0 | 0 | 7 | 0 | 10 | 0 | 0 | 0 | 0 | 0 | 0 | 0 | 0 | 0 |
| 7 | 0 | 0 | 0 | 0 | 0 | 0 | 0 | 10 | 0 | 0 | 0 | 0 | 0 | 0 | 0 | 0 |
| 8 | 0 | 0 | 0 | 0 | 0 | 0 | 0 | 0 | 10 | 0 | 0 | 0 | 0 | 0 | 0 | 0 |
| 9 | 10 | 0 | 7 | 7 | 1 | 1 | 0 | 0 | 0 | 10 | 8 | 8 | 8 | 8 | 8 | 8 |
| 10 | 0 | 10 | 7 | 7 | 1 | 1 | 0 | 0 | 0 | 8 | 10 | 8 | 8 | 8 | 8 | 8 |
| 11 | 7 | 7 | 10 | 0 | 1 | 1 | 0 | 0 | 0 | 8 | 8 | 10 | 8 | 8 | 8 | 8 |
| 12 | 7 | 7 | 0 | 10 | 1 | 1 | 0 | 0 | 0 | 8 | 8 | 8 | 10 | 8 | 8 | 8 |
| 13 | 1 | 1 | 1 | 1 | 10 | 1 | 0 | 0 | 0 | 8 | 8 | 8 | 8 | 10 | 8 | 8 |
| 14 | 1 | 1 | 1 | 1 | 1 | 10 | 0 | 0 | 0 | 8 | 8 | 8 | 8 | 8 | 10 | 8 |
| 15 | 0 | 0 | 0 | 0 | 0 | 0 | 0 | 0 | 0 | 8 | 8 | 8 | 8 | 8 | 8 | 10 |

INPUT FEATURES

HANDWRITTEN SYMBOL RECOGNIZER

CROSS-REFERENCE TO RELATED APPLICATION

This application is a continuation of U.S. patent application Ser. No. 08/452,660, filed May 25, 1995, now abandoned, which is a continuation of U.S. patent application Ser. No. 08/086,333, filed Jun. 30, 1993, now abandoned.

TECHNICAL FIELD

The present invention relates to handwritten symbol recognition and more particularly to recognition of symbols using individual features of the symbols and the symbols as a whole.

BACKGROUND OF THE INVENTION

Various devices have been created to input data and other information into a computer. Two of the most common such devices are a keyboard and a pointing device such as a mouse. While such devices are capable of inputting numerous forms of information, such devices have their limitations. The use of a keyboard is effectively limited to those users who know how to type efficiently. Keyboards are normally limited to a single language or character representation system and therefore are not easily adaptable to users of differing nationalities. Perhaps the most important limitation of keyboards is their relatively large size. With the advent of ever-smaller computers such as palm-top and personal digital assistants (PDAs), the large size of the keyboards renders them unacceptable for such computers.

The drawbacks of the keyboard are magnified when using a large alphabet language such as Chinese or Kanji. The number of Chinese/Kanji characters needed to convey more than very basic information exceeds 2,000 characters and may be as high as 50,000. The number of keys needed to input such numerous characters makes Kanji and Chinese keyboards extremely cumbersome in terms of both size and ease of use. Indeed, their use is limited to professionals given highly extensive training.

Pointing devices such as mice alleviate some of the problems of keyboards but have drawbacks of their own. In particular, pointing devices are designed to be used in conjunction with a graphical user interface (GUI) to point to various locations on a display screen. The GUI assigns predetermined functions to the locations on the display screen. The actions of the pointing device are limited to the predetermined functions of the GUI and are not easily extended to character input. In addition, like keyboards, pointing devices typically are too large or awkward to be used with small computers such as a palm-top computer.

Given the inherent shortcomings of keyboards and pointing devices, a large demand exists for input devices that can recognize symbols handwritten by a user. Symbol recognizers include two parts: a unit for converting the physical motions of a handwriting implement into binary information processable by the computer and a recognition unit for determining the meaning of the handwritten symbol. Numerous well-known devices are available for converting the physical writing of the user into binary information. Such devices include electronic tablets that interact with a user-controlled electronic pen to convert the symbols into binary information as they are being written. Alternatively, electronic scanners may be used to translate a full page of handwritten symbols some time after the symbols are written.

The difficulty in symbol recognition is in determining the meaning of the symbols that are written. One of the major problems in recognizing handwriting is that the handwriting includes features that uniquely identify a symbol and features that are peculiar to each person and even to each writing sample of a single person. Features that uniquely identify these symbols must be analyzed for recognition; features that are peculiar to the person's handwriting may be discarded. Compounding this problem is the large amount of data available in a handwriting recognition system. A typical electronic tablet has a resolution of 200 points per inch with a sampling rate ranging from 60 to several hundred points per second, thus providing a large amount of data. Theoretically, each of the numerous data points produced in writing a single symbol could be compared individually with each point of each symbol model in a data base of numerous symbol models in order to find the symbol model that most closely matches the handwritten symbol. However, such a comparison would be extremely wasteful in terms of time and computer processing resources.

SUMMARY OF THE INVENTION

A preferred embodiment of the present invention is directed to a handwritten symbol recognizer adapted to automatically recognize various handwritten symbols including Kanji characters. The symbol recognizer advantageously recognizes a handwritten symbol by evaluating both individual features and the symbol as a whole. The symbol recognizer includes a data processor coupled to a user interface that receives handwritten input symbols from a user and displays reference symbols determined by the symbol recognizer to correspond to the handwritten symbols. The data processor includes a memory unit which temporarily stores coordinate information representing features of the input symbols as received from the user interface. The data processor includes a symbol analyzer that retrieves the coordinate information from the memory unit and translates the coordinate information for each written feature into a feature code representing one of a predetermined number of feature models stored in the memory. The symbol analyzer also creates a geometric representation of the input symbol for comparison with one or more geometric models stored in the memory unit. The data processor includes a label comparator adapted to evaluate individual features by comparing the feature codes for the input symbol with feature codes of reference symbols stored in the memory unit and to identify the reference symbol or symbols having feature codes that most closely match the feature codes of the input symbol. The data processor also includes a geometric comparator that evaluates the symbol as a whole by comparing stored geometric models corresponding to the reference symbols most closely matching the input label with the geometric representation of the input symbol. The geometric comparator uses its comparison to identify the reference symbols whose geometric model or models most closely match the geometric representation of the input symbol. The reference symbol that most closely matches the handwritten input symbol, as determined by the label and geometric comparators, is sent to the user interface which displays the reference symbol to the user.

DETAILED DESCRIPTION OF THE INVENTION

Figure 1:
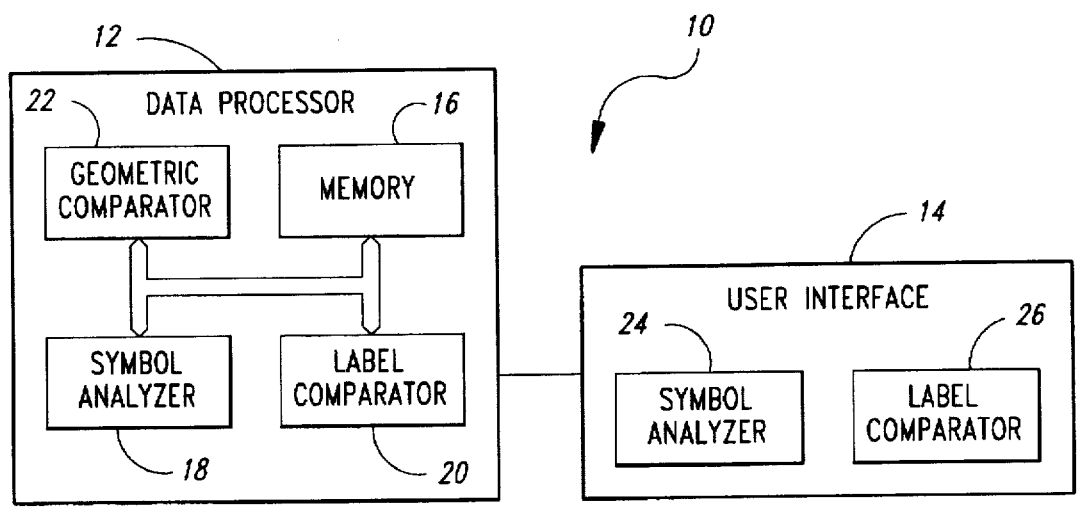
FIG. 1 is a block diagram of the handwritten symbol recognizer according to the present invention.

A preferred embodiment of the present invention is directed to a handwritten symbol recognizer 10 shown in FIG. 1. The symbol recognizer 10 includes a data processor 12 coupled to a user interface 14 that receives handwritten input symbols from a user and displays reference symbols determined by the symbol recognizer to correspond to the handwritten symbols. The data processor 12 includes a memory unit 16 that temporarily stores coordinate information representing features of the input symbols as received from the user interface. The data processor includes a symbol analyzer 18 that retrieves the coordinate information from the memory unit 16 and translates the coordinate information for each written feature into a feature code representing one of a predetermined number of feature models stored in the memory. The symbol analyzer also creates a geometric representation of the input symbol for comparison with one or more geometric models stored in the memory unit.

The symbol recognizer 10 advantageously evaluates both individual features of the handwritten symbol and the symbol as a whole. The individual feature evaluation is accomplished by a label comparator 20 that compares the feature codes for the input symbol with feature codes of reference symbols stored in the memory unit and identifies the reference symbol or symbols having feature codes that most closely match the feature codes of the input symbol. The whole symbol evaluation is performed by a geometric comparator 22 that compares stored geometric models corresponding to the reference symbols having the most closely matching features with the geometric representation of the input symbol. The geometric comparator uses its comparison to identify the reference symbols whose geometric model or models most closely match the geometric representation of the input symbol. The reference symbol that most closely matches the handwritten input symbol, as determined by the label and geometric comparators, is sent to the user interface which displays the reference symbol to the user.

The data processor 12 may be of conventional type such as a personal computer operating with an Intel 486 microprocessor. The memory unit 16 can include any of the known memory devices, such as random access memory (RAM), magnetic tape memory (hard or floppy drives), and optical storage devices (compact discs). The symbol analyzer 18, label comparator 20, and geometric comparator 22 can be hardwired circuits, but preferably are software programs stored in memory in the data processor. The user interface 14 includes an input device 24 such as a conventional digitizer tablet and pen or an electronic scanner. Generally the input device provides a series of X-Y coordinate points to define segments of strokes that correspond to continuous motion of the pen on the digitizing table or of the pattern of the symbol as detected by the electronic scanner. The input device sends the coordinate points to the memory 16 where they are stored while the symbols are being recognized. The user interface also includes a display device 26 such as a CRT or LED display. When the present invention is used in connection with a palm-top computer or a personal digital assistant (PDA), the user interface and the data processor are part of a single unit and the input device may be overlaid on the display device.

Figure 3:
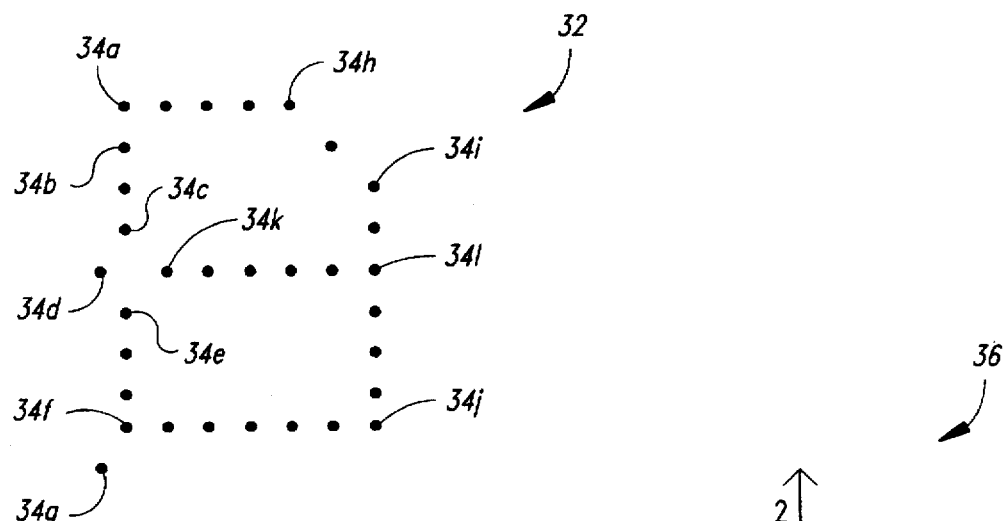
FIG. 3 is a coordinate-transformed representation of an exemplary handwritten input symbol to be recognized by the symbol recognizer shown in FIG. 1.
Figure 2:
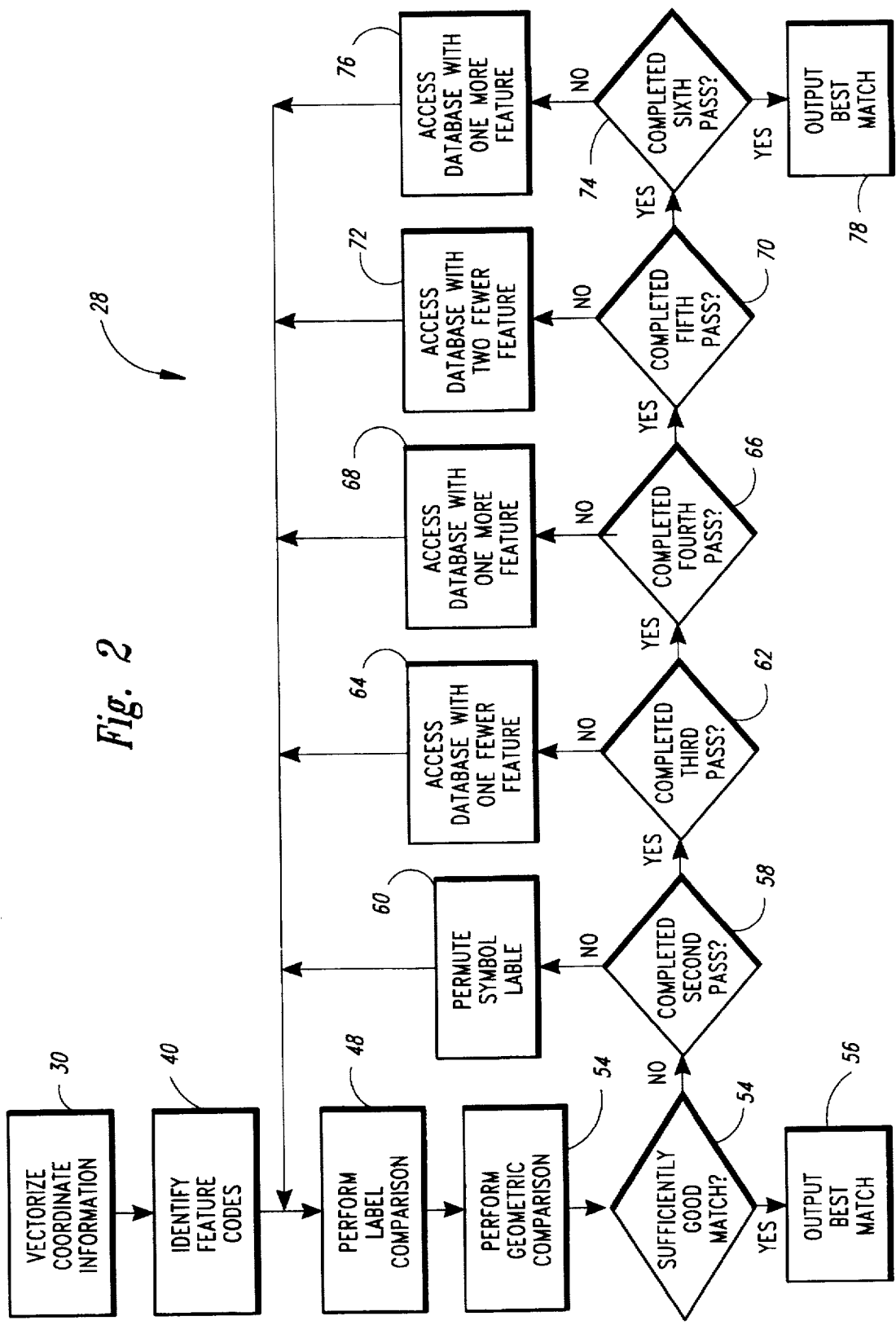
FIG. 2 is a flow chart of a preferred embodiment of the handwritten symbol recognition method of the present invention.

A preferred embodiment of the handwriting recognizing method of the present invention can be appreciated in conjunction with the flow chart shown in FIG. 2 and an example of a coordinate representation of a written Kanji input symbol 32 as shown in FIG. 3. The symbol shown in FIG. 3 is intended to be the Kanji character for the sun and includes numerous coordinate points 34 defining the symbol. The sampling rate of the digitizer tablet will produce many more coordinate points, but for simplicity, a subset of the coordinate points is shown in FIG. 3.

The symbol analyzer 18 retrieves the coordinate information identifying the handwritten input symbol 32 from the memory 16. In step 30, the symbol analyzer vectorizes the coordinate information to identify the direction traveled by the user-operated pen in creating the strokes of the handwritten input symbol. Vectorizing the input symbol preferably is accomplished by determining the direction traveled between adjacent coordinate points and identifying a reference vector associated with that direction. It should be noted that because of the large number of coordinate points, some of the coordinate points may be skipped such that the points vectorized are not immediately adjacent. A decrease in the number of points skipped increases the accuracy of the symbol recognition, but increases the memory and processing requirements. The direction (θ) traveled between a first coordinate point ($x_n$, $y_n$) and a second coordinate point ($x_{n+1}$,$y_{n+1}$) can be determined by:

$$\tan \theta = \frac{y_{n+1} - y_n}{x_{n+1} - x_n} .$$

For example, from coordinate point 34a to coordinate point 34b, there is no change in the X direction and a relatively large change in the negative Y direction. Assuming that the difference in y-values is −1, the equation becomes $$\tan \theta = \frac{-1}{0} ,$$

resulting in θ=−90°.

Figure 4:
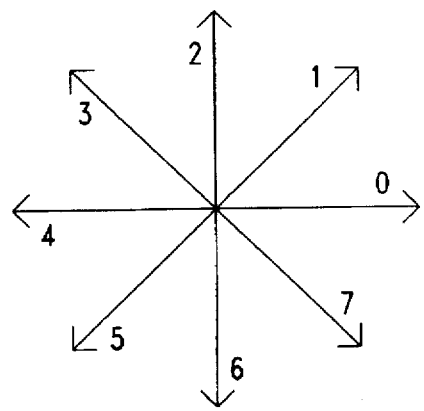
FIG. 4 is a pictorial representation of a set of numbered reference vectors used by the symbol recognizer of FIG. 1.

Shown in FIG. 4 is a set 36 of eight-numbered reference vectors. The numbered reference vectors provide a shorthand vectorial representation 38 of the handwritten input symbol. More reference vectors may be used for increased accuracy at the expense of increased storage and processing complication. Reference vector 0 is used to represent an angle θ from −22.5 to 22.5 degrees and reference vector 1 is used to represent an angle θ from 22.5 to 67.5 degrees. All eight reference vectors are classified in a similar manner. Given that the angle θ formed from coordinate point 34a to coordinate point 34b is −90°, the corresponding reference vector is reference vector 6 shown in FIG. 4. The steps of computing the angle θ between adjacent coordinate points and associating the angle θ computed with one of the reference vectors shown in FIG. 4 are repeated for each of the coordinate points of the input symbol. Performing such steps for each of the coordinate points yields chains of reference vectors as shown in FIG. 5.

Figure 5:
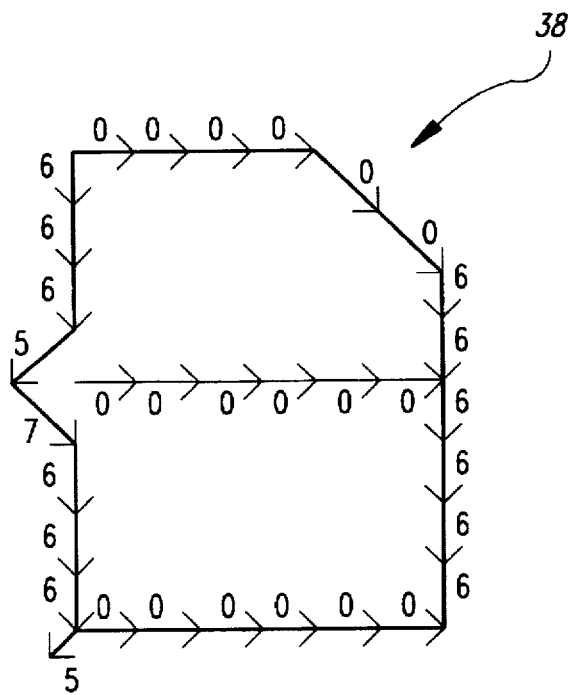
FIG. 5 is a vectorial representation of the handwritten input symbols shown in FIG. 3.
Figures 6, 8:
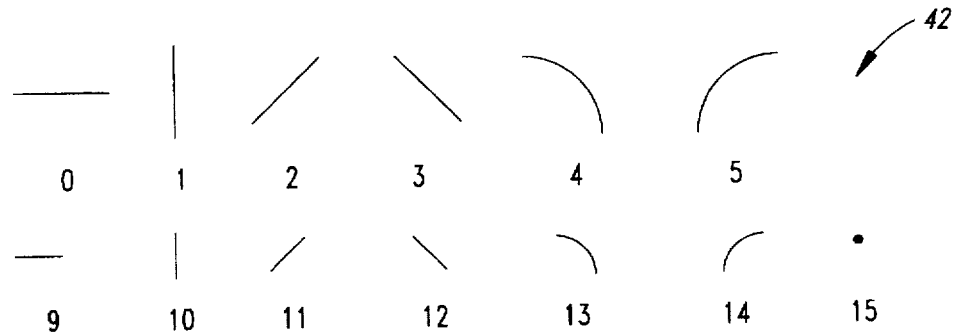
FIG. 6 is a pictorial representation of a reference grid used by the symbol recognizer of FIG. 1.
FIG. 8 is a comparison matrix used by the symbol recognizer of FIG. 1.

Referring again to the vectorial representation 38 of the Kanji sun symbol shown in FIG. 5, the feature code identification begins with the upper left-hand corner of the figure. The first written stroke of the input symbol 32 extends from coordinate point 34a to coordinate point 34f, at which point the user lifted the pen from the digitizer tablet. The portion of the stroke from coordinate point 34a to coordinate point 34c is a straight line represented by three consecutive reference vectors designated 6. If the user had lifted the pen at reference point 34c, then the stroke segment from 34a to 34c would be recognized as being associated with feature models having feature code 1 or feature code 10 (as shown in FIG. 6), depending upon the arbitrary size associated with the large feature codes 0–5 with respect to the small reference codes 9–14. However, assuming that the user did not lift the pen anywhere between coordinate point 34a and coordinate 34g either the sloppy handwriting of the user or an imperfection in the input device 24 caused the coordinate point 34d to be outside the angular range associated with reference vector 6. As a result, reference vector 5 was produced between coordinate points 34c and 34d and reference vector 7 was produced between coordinate point 34d and coordinate point 34e.

Because the stroke section from coordinate point 34e to coordinate point 34f returned to vertical alignment, it may be that the user intended the stroke to go directly from coordinate point 34a to coordinate point 34f in a straight vertical line. As a result, it is desirable to evaluate the portion of the stroke between coordinate points 34c and 34e to determine whether it should be considered an unintentional anomaly. This is accomplished by counting the number of reference vectors in the anomalous portion (2 reference vectors) and dividing that number by the total number of reference vectors for the entire stroke between coordinate points 34a and 34g. The result of the division is compared to a predetermined threshold (e.g., ⅓). If the division result is less than the threshold then the reference vectors 5 and 7 are changed to become two consecutive 6 reference vectors.

In addition to removing anomalies such as that occurring along the stroke between coordinate points 34c and 34e, the symbol analyzer 18 removes "hooks" occurring at the end of the stroke. A hook occurs when a user fails to pick up the pen when/he intended stroke is finished and inadvertently drags the pen farther than intended. Such a hook is represented by a portion of the stroke between coordinate points 34f and 34g. The symbol analyzer 18 performs "dehooking" in a manner similar to that used to smooth anomalies occurring somewhere in the middle of the stroke. If the distance between coordinate points 34f and 34g is less than a predetermined threshold fraction of the distance between coordinate points 34a and 34f, then the coordinate point 34g and the reference vector 5 are ignored. After the smoothing and dehooking steps, the stroke between coordinate points 34a and 34f will simply be a straight vertical line of consecutive number 6 reference vectors with no hook after coordinate point 34f. In a preferred embodiment, the threshold fraction for dehooking is set at one sixth of the length of the stroke.

In step 40 (FIG. 2), the symbol analyzer 18 identifies feature codes corresponding to the features of the handwritten input symbol 32. Shown in FIG. 6 is a set 42 of 13 feature models, each of which has a corresponding feature code between zero and fifteen that is stored in the memory 16. The 13 feature codes can be used to represent any handwritten input symbol, including Kanji characters. Reference features 9–14 are substantially identical to reference features 0–5 except that reference features 9–14 are smaller than reference features 0–5. Reference features 4 and 13 represent any curved line made in a clockwise direction. Similarly, reference symbols 5 and 14 represent any curved line made in a counterclockwise direction. Each feature code for the handwritten input symbol is determined by identifying the feature code associated with the feature model that most closely matches a chain of reference vectors.

Returning to the vectorial representation 38 of the input symbol, the chains of reference vectors are compared to the set 42 of reference features and associated feature codes shown in FIG. 6. Given that the stroke from coordinate point 34a to coordinate point 34f is a straight vertical line, the most closely matching reference features are those indicated by feature codes 1 and 10. To distinguish between feature codes 1 and 10, the length of the feature to be characterized is compared to the length of the entire written symbol. Because the vertical line extending from coordinate points 34a–34f is equal in length to the length of the entire input symbol, the feature is determined to correspond to feature code 1 rather than feature code 10. If the feature were less than a threshold fraction, such as one-fourth, of the entire input symbol, the feature would have corresponded to feature code 10.

While a feature code of 1 uniquely conveys information that the feature between coordinate points 34a and 34f is a vertical line, it does not convey any information as to the position of the vertical line. To provide such positional information, the symbol analyzer 18 employs a reference grid 44, such as a 16×16 grid. An adjusted input symbol 46, that is, the input symbol 32 as modified by smoothing and dehooking, is analyzed using the reference grid. The symbol analyzer saves coordinate points corresponding to the end points of the adjusted input symbol 46. With respect to the vertical line feature of the modified input symbol having a feature code of 1, the end points of the feature are (0, 0), and (0, 15).

The process of assigning feature codes and positional coordinate points for the remaining features of the adjusted input symbol 46 is substantially the same as that described above for the vertical line feature extending between coordinate points 34a and 34f. The stroke extending between coordinate points 34a and 34j via coordinate points 34h and 34i is slightly more complicated. It is possible that the user intended that stroke to be three separate features: the first feature extending between coordinate points 34a and 34h, the second feature extending between coordinate points 34h and 34i, and the third feature extending between coordinate points 34i and 34j. However, because the user did not lift the pen in creating the stroke between coordinate points 34a and 34j, the symbol analyzer 18 assumes that the user intended the stroke to be a single feature. As a result, the symbol analyzer compares the entire stroke with the set 42 (FIG. 6) of reference features and determines that the reference features corresponding to feature codes 4 and 13 most closely match the feature of the input symbol. The symbol analyzer then compares the size of the input feature to the entire input symbol and determines that the feature is larger than the predetermined threshold fraction (¼ in preferred embodiment) such that the corresponding reference feature is feature code 4 rather than feature code 13.

Note that the symbol analyzer 18 does not always recognize a stroke as a single feature. For example, the number "3" is customarily made with one stroke, i.e., without lifting the pen until the end, but contains two features. The symbol analyzer breaks the stroke into two features by determining that the stroke made a sharp change in direction from a vector 4 to a vector 0 at the midpoint of the stroke.

Figure 7:
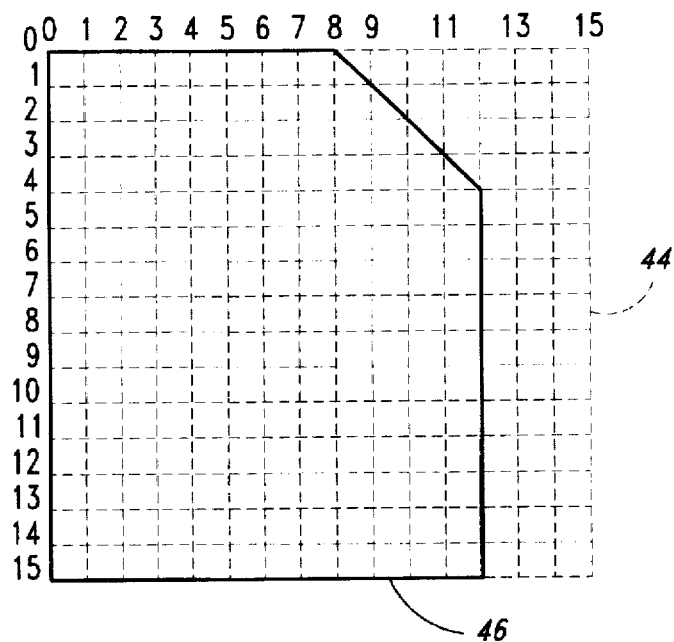
FIG. 7 is a pictorial representation of a set of reference features and correspondent feature codes used by the symbol recognizer of FIG. 1.

Because of the curved shape of the feature model corresponding to feature code 4, the end points of the input feature do not carry sufficient information to identify the input feature. That is because there is an infinite number of very different curved, clockwise lines that can include the same end points. As a result, the symbol analyzer 18 saves the beginning end point and an inflection point representing the maximum X value and the minimum Y value of the feature. As shown in FIG. 7 with respect to the curved input feature corresponding to feature code 4, the beginning end point is 0, 0, a minimum Y value is 0 and the maximum X value is 12 so the geometric information for the input feature can be represented as [0, 0:12, 0].

It should be noted that features corresponding to feature codes 5 and 14 are handled similarly to features corresponding to feature codes 4 and 13. For features corresponding to feature codes 5 and 14, the symbol analyzer 18 stores the X and Y values of the beginning end point together with the minimum X value of the feature and the maximum Y value of the feature. The dot feature code 15 preferably is handled by storing a single coordinate point.

Upon performing step 40 for each of the features in the input symbol, the symbol analyzer 18 stores in the memory 16 both feature codes and geometric information associated with those features. With respect to the adjusted input symbol 46 shown in FIG. 7, the memory stores an input label 1400 formed by the combination of the feature codes 1, 4, 0, and 0 associated with the four strokes in the order these strokes were written. The geometric information stored for each stroke includes the end points for the features having feature codes 1 and 0 and the beginning end point and the inflection point for the feature having feature code 4 determined using the reference grid 44. As a result, the geometric information for the adjusted input symbol 46 is [0, 0:0, 15], [0, 0:12, 0], [1, 8:12, 8], and [0, 15:12, 15].

In step 48 of FIG. 2, the label comparator 20 performs label comparison on the adjusted input symbol 46. Label comparison involves comparing the input label 1400 for the input symbol with numerous label models stored in the memory 16. The memory stores one or more label models for each symbol to be recognized, the label models being derived using the same type of feature analysis discussed above. The label comparator employs a comparison matrix 50 as shown in FIG. 8 to assess the relative matches between individual features forming the input label and the label model. Because there are four features in the input symbol, the label comparator compares the input label only with label models having four features during a first pass comparison.

As an example of how the label comparator 20 employs the comparison matrix, assume that the input label is to be compared to a first label model 2309. The first feature of the input label is 1 and the first feature of the label model is 2. The label comparator looks at the intersection of row 1 and column 2, which yields a comparison matching value of 7. The comparison matching values range from 0 to 10, with 0 signifying the worst matched and 10 signifying the best match. Such a matching value of 7 is a relatively good match. With respect to the remaining features of the input symbol, the comparison of feature 4 with the feature 3 of the label model yields a matching value of 1. The third feature code of the input label is a 0 which when compared to the feature code 0 in the third position of the label model yields a matching value of 10; a perfect match. The fourth feature code of the input label is a 0 which when compared to the 9 in the fourth position in the label model also yields a matching value of 10. As can be seen from the comparison matrix, a comparison of each of the large feature modes corresponding to feature codes 0–5 with the small version of the same feature models 9–14 yields matching values of 10. As such, the label comparator gives no comparison penalty for a user who writes a feature that is smaller than the feature normally used for that symbol.

The label comparator 20 computes the total of the matching values found in comparing the input label 1400 with the label model 2309 and obtains a label matching value of 28 (7+1+10+10). The label matching value for the label model is then compared to a threshold value, such as 25, to determine whether it is a relatively good match. Since a matching value of 28 is greater than the threshold value of 25, the label comparator determines that the label 2309 is a good match.

A label comparison does not stop as soon as the label comparator 20 finds a single good match. For example, assume that the memory 16 also stores label models 2222, 1400, and another 1400 in addition to the label model 2309. The reason for having more than one 1400 label model is to allow alternate geometric representations for the same label models to accommodate handwriting differences of the same symbol. In addition, the two different symbols may have the same label model with different geometric representations. Performing label comparison on the additional label models results in a matching value of 22 (7+1+7+7) for the 2222 label model and a matching value of 40 for the two 1400 label models.

In step 52 of FIG. 2, the geometric comparator 22 performs geometric comparison on the input symbol. Geometric comparison involves comparing the geometric information for the input symbol with geometric information stored for each of the label models that are determined by the label comparator to be good matches. The geometric comparator operates by computing the Euclidean vector distances for each geometric model, the Euclidean vector distance representing how closely the geometric model matches the geometric representation of the input symbol. Returning to the example, assume that the geometric models corresponding to the label models determined to be good matches by the label comparator are as follows:

| [7, 0:0, 15]   | [0, 0:0, 14]   | [0, 0:0, 15]   |
| [7, 0:14, 15]  | [0, 0:13, 0]   | [0, 0:14, 0]   |
| [4, 6:10, 6]   | [0, 7:13, 7]   | [0, 8:12, 7]   |
| [0, 15:14, 15] | [1, 14:13, 14] | [0, 15:13, 15] |
| 2390           | 1400           | 1400           |

The geometric comparator 22 computes the Euclidean vector distance (EVD) for each geometric model as compared to the input symbol geometric information of: [0, 0:0, 15][0, 0:12, 0][1, 8:12, 8][0, 15:12, 15]. Defining the values of the geometric model and the input symbol geometric representation as $[X_{11}, Y_{11}:X_{12}, Y_{12}][X_{21}, Y_{21}:X_{22}, Y_{22}]$ $[X_{31}, Y_{31}:X_{32}, Y_{32}][X_{41}, Y_{41}:X_{42}, Y_{42}]$, the geometric comparator computes the EVD as follows where a superscript of m indicates a model value and a superscript of i indicates an input value:

$$EVD = \begin{array}{l}(x_{11}^l - x_{11}^m)^2 + (x_{12}^l - x_{12}^m)^2 + (x_{21}^l - x_{21}^m)^2 + (x_{22}^l - x_{22}^m)^2 + \\ (x_{31}^l - x_{31}^m)^2 + (x_{32}^l - x_{32}^m)^2 + (x_{41}^l - x_{41}^m)^2 + (x_{42}^l - x_{42}^m)^2 + \\ (y_{11}^l - y_{11}^m)^2 + (y_{12}^l - y_{12}^m)^2 + (y_{21}^l - y_{21}^m)^2 + (y_{22}^l - y_{22}^m)^2 + \\ (y_{31}^l - y_{31}^m)^2 + (y_{32}^l - y_{32}^m)^2 + (y_{41}^l - y_{41}^m)^2 + (y_{42}^l - y_{42}^m)^2 \end{array}$$

With respect to geometric model corresponding to label model 2390, the geometric comparator 22 computes Euclidean vector distance as follows:

$$EVD = \begin{array}{l}(0-7)^2 + (0-0)^2 + (0-7)^2 + (12-14)^2 + \\ (1-4)^2 + (12-10)^2 + (0-0)^2 + (12-14)^2 + \\ (0-0)^2 + (15-15)^2 + (0-0)^2 + (0-15)^2 + \\ (8-6)^2 + (8-6)^2 + (15-15)^2 + (15-15)^2 = 352.\end{array}$$

Similarly, the geometric comparator computes Euclidean vector distances of 11 and 7 for the geometric models corresponding to the two 1400 label models. In step 50 of FIG. 2, the Euclidean vector distances computed for each of the geometric models are compared to a geometric matching threshold to determine whether the geometric model is a good match. In a preferred embodiment, the geometric matching threshold is set at 32 times the number of features in the input symbol, which for the four-feature input symbol in the example yields a geometric matching threshold of 128. Given that the Euclidean vector distance computed for the geometric model corresponding to the 2390 label model is greater than the geometric matching threshold, the geometric comparator determines that the 2390 geometric model is not a good match, while the geometric models corresponding to the 1400 label models are good matches.

In step 54, the geometric comparator 22 determines that both of the geometric models corresponding to the 1400 label models pass the geometric matching threshold and therefore are sufficiently good matches. Both geometric models correspond to the Kanji sun symbol, so the geometric comparator causes the display device 26 to display the Kanji sun symbol in step 56.

If the geometric model corresponding to the 2390 label model had also passed the geometric threshold, then the geometric comparator 22 would have had to decide which reference symbol to display. Preferably, the geometric comparator decides by counting the number of passed geometric models that correspond to the same reference symbol. In the example, the two models corresponding to the 1400 label models correspond to the same reference symbol (Kanji sun), while there is only one well-matching geometric model corresponding to the 2390 label model. As a result, the geometric comparator determines that the Kanji sun symbol is the best match and causes the display device 26 to output that symbol.

In the example discussed above, the label models and geometric models associated with the Kanji sun symbol matched the input symbol 32 sufficiently well to justify displaying the Kanji sun symbol without further analysis. However, if the user had written the strokes of the input symbol in a different order, the analysis would have been different.

For example, assume that the user wrote the input symbol 32 with the first and second strokes reversed. After the symbol analyzer 18 vectorizes the input data and smoothes and de-hooks the vector codes, it identifies the appropriate feature codes as 4100. The label comparator 20 performs label comparison in step 48, which determines that the label models 2390, 2222, 1400, and 1400 produce matching values of 28, 22, 22, and 22, respectively. Using a label matching threshold of 25, the label comparator determines that the label model 2390 is the only good match. In one embodiment, the label comparator causes the display device 26 to display the reference symbol corresponding to a label model that is the only label model to pass the label matching threshold, so the reference symbol corresponding to the label model 2390 would be displayed. However, in a preferred embodiment, the geometric comparator 22 performs geometric comparison on the geometric models corresponding to the label model or models that exceed the label matching threshold, which in the example is limited to the 2390 label model (step 52). In performing geometric comparison of the geometric model corresponding to the 2390 label model with respect to the geometric representation of the input symbol, the geometric comparator computes a geometric matching value of 688. It should be noted that the geometric representation of the input symbol corresponding to the 4100 input label differs from the geometric representation of the input symbol corresponding to the 1400 input label only to the extent that the first two features are reversed. In step 54, the geometric comparator compares the 688 with the geometric matching threshold of 128 and determines that there is no sufficiently good match. In step 58, the data processor 12 determines that a second pass has not been completed and begins a second pass analysis of the input symbol.

The second pass analysis begins in step 60 in which the label comparator 20 permutes the feature codes of the input label. Permuting refers to re-ordering the feature codes of the input according to a predetermined sorting procedure. Returning to the example, the input label of 4100 can be permuted to 1004, 1040, 1400, 0041, etc. The sorting procedure can be random, ascending, descending, or any other order. The permuted labels are compared to the label models by the label comparator in step 48. If a comparison of one of the permuted labels matches one of the label models, then the geometric comparator 22 performs geometric comparison of the geometric representation of the permuted symbol with the geometric model corresponding to matching label model. Preferably, the geometric comparison is done immediately after a single good label match is found, rather than waiting for all of the label models that exceed the label matching threshold as is done in the preferred embodiment of the first pass.

Returning to the example, the label comparator 20 uses a sorting order that produces a permuted label of 1004 in step 60. Assume that when the label comparator performs label comparison for the 1004 permuted label, no label models are found that pass the label matching threshold. Next, the label comparator produces a 1040 permuted label and again finds no label models that pass the label matching threshold. Next, the label comparator produces a 1400 permuted label. The label comparator determines that the 2390 label model exceeds the label matching threshold. The geometric comparator 22 compares the geometric model corresponding to the 2390 label model with the geometric representation of the 1400 permuted label and does not find a good geometric match. Label comparison continues with the succeeding label models until the label comparator finds that one of the 1400 label models is a good label match. The geometric comparator compares the geometric model corresponding to the 1400 label model with the geometric representation of the 1400 permuted label and finds a good geometric match in steps 52 and 54. In step 56, the geometric comparator causes the display device 26 to display the Kanji sun symbol corresponding to the 1400 label model.

In the first two examples, the user wrote an input symbol with the correct number of strokes, so the label comparator found good matching symbols in the memory 16 by performing label comparison only with label models having the same number of features as the input label. However, users often fail to include all of the correct strokes or include too many strokes for the symbol that they are attempting to write. This problem is particularly common which writing Kanji or other symbols that include numerous strokes.

As a third example, assume that the user wrote an input symbol that is identical to the input symbol written in the first example, except that the user forgot to include the second horizontal stroke of the Kanji sun symbol. As a result, the symbol analyzer 18 produces an input label of 140. Assume that in the first pass the label comparator 20 finds no 3-feature label models that match the 140 input label. Further, assume that in the second pass the label comparator finds no 3-feature label models that match the permutations of the 140 input label. After the second pass, data processor 12 determines that a third pass has not yet been performed (step 62).

The third pass begins with the label comparator 20 accessing a database storing label models having one fewer feature (two features) than the number of features in the input label (step 64). The label comparator compares the input label with each of the label models in the two-feature database (step 48). Given there are three features in the input label and only two features in the label models, only two of the features of the input label are used to compute a label matching value for each label model. The comparison is performed on a feature-by-feature basis. The first feature of each label model is compared to each of the three features of the input label. The feature of the input model that most closely matches the first feature of the label model is marked. The second feature of the label model is compared with the features of the input label except for the feature that most closely matched the first feature of the label model. The feature code matching values taken from the comparison matrix 48 (FIG. 8) for the two most closely matching features are added together to get a label matching value for each two-feature label model. Each of the label matching values is compared to a label matching threshold appropriate for two-feature matching.

If there are any label models that pass the label matching threshold, then the geometric comparator 22 compares the geometric models corresponding to the passing label models with the geometric representation of the input symbol. The geometric comparison is performed on the geometric features of the input symbol that correspond to the two feature codes that were used by the label comparator in computing the label matching value for the label model. If the label and geometric models associated with a reference symbol pass the label and geometric comparisons, then the geometric comparator causes the display device 26 to display the reference symbol.

Assuming that no matching reference symbols are found in the third pass, the data processor 12 determines that a fourth pass has not yet been completed (step 66). The fourth pass begins with the label comparator 20 accessing a database storing label models having one more feature (four features) than the number of features in the input label (steep 68). The label comparator compares the input label with each of the label models in the four-feature database (step 48). Given there are three features in the input label and four features in the label models, only three of the features of the label models are used to compute a label matching value for each label model. Like the pass three comparison, the pass four comparison is performed on a feature-by-feature basis. The first feature of the input label is compared to each of the four features of each label model. The feature of the label model that most closely matches the first feature of the input label is marked. The second feature of the input label is compared with the features of the label model except for the feature that most closely matched the first feature of the input label. After finding the best match for each of the features of the input label, the label comparator determines whether the label matching value for each of the label models passes the label matching threshold.

Returning to the example, the label comparator 20 compares the input label 140 to each of the four-feature label models stored in the memory 16. With respect to the 2390 label model, the 2, 3, and 0 most closely match the 1, 4, and 0 of the input label (the 2 and 3 of the label model match the 1 and 4 of the input label equally well, so the label comparator simply chooses the first available matching feature code for each feature). The label comparator computes the matching value for the 2390 label to be 18 (7+1+10). The label comparator compares the matching value to a predetermined matching value threshold, such as 19, and determines that the 2390 label model does not match the input label sufficiently well. The process is repeated for the 2222 label model and a good match is not found.

The label comparator 20 compares the input label 140 with the label model 1400 according to the same method used for the 2390 and 2222 label models. The label comparator determines that the 140 of the label model exactly matches the 140 of the input label. As a result, the geometric comparator 22 compares the geometric model corresponding to the 1400 label model with the geometric representation of the input symbol (step 52). The geometric comparator compares only those features of the geometric model that correspond to the feature codes used in the label comparison (140). The features of the geometric representation of the input symbol are [0,0:0,15], [0,0:12,0], and [1,8:12,8] and the features of the geometric model are [0,0:0,14], [0,0:13, 0], and [0,7:13,7]. The geometric comparator computes a Euclidean vector distance (EVD) of 6 and compares the 6 to a predetermined geometric matching threshold, such as 128. Note that some designers may find it desirable to adjust the threshold downward after the first or second pass to make it easier to find a match. The EVD of 6 is less than the threshold, so the geometric comparator causes the display device 26 to output the reference symbol corresponding to the 1400 label model (Kanji sun symbol) (step 56).

If the fourth pass did not produce a sufficiently good match, then the data processor 12 determines whether a fifth pass has been performed (step 70). In the fifth pass, the label comparator 20 accesses a database that stores label models having two fewer features than the input label (step 72). The label and geometric comparisons are then performed in the same manner as described above with respect to the third pass.

Assuming that the fifth pass does not produce a sufficiently good match, then the data processor 12 determines whether a sixth pass has been performed (step 74). In the sixth pass, the label comparator 20 accesses a database that stores label models having two more features than the input label (step 76). The label and geometric comparisons are then performed in the same manner as described above with respect to the fourth pass. If no good matches are found in the sixth pass, one embodiment of the invention performs further passes using databases storing label models having successively fewer and more features than the input label. In a preferred embodiment, the data processor 12 simply causes the display device 26 to output the most closely matching reference symbol found regardless of whether it passes the label and geometric matching thresholds.

It should be appreciated that although a Kanji sun symbol was recognized in the examples discussed above, other symbols, such as numbers, letters, and editing symbols can be recognized. In addition, the thirteen reference features shown in FIG. 6 can be changed or augmented to accommodate the symbols being recognized.

The preferred embodiment of the present invention provides a symbol recognizer 10 that performs excellent symbol recognition of approximately 75%-90% accuracy, depending on the user's handwriting. The symbol recognizer provides such accuracy by evaluating both individual features of a handwritten symbol using a label comparator and the symbol as a whole using a geometric comparator. By storing reference symbols using small label models and geometric models based on a limited number of coordinate points (e.g., two per geometric model), the present invention requires much less memory than prior art systems.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An automatic handwritten symbol recognizer that recognizes a handwritten input symbol having sequential features written according to a time sequential order, comprising:

a symbol analyzer that receives a time sequence of coordinate information representing the sequential features of the input symbol according to the time sequential order in which the sequential features were written, translates the coordinate information for each written sequential feature into a feature code representing one of a predetermined number of feature models, and produces an input label of feature codes ordered according to the time sequential order in which the features were written, the symbol analyzer also creates a geometric representation of the input symbol, the geometric representation including data representing positions of the features of the input symbol;

a memory storing reference symbol information including a plurality of label models and a plurality of geometric models, each label model including a plurality of feature codes in a predetermined order and corresponding to one of the geometric models, each geometric model storing data representing positions of features of a reference symbol represented by the geometric model;

a label comparator that compares the input label with the label models without regard for positions of the features represented by the feature codes of the input label and identifies a most closely matching subset of the stored label models by identifying the label model or models that most closely match the input label regardless of the positions of the features represented by the feature codes of the input label; and a geometric comparator that compares only the geometric models corresponding to the label models of the most closely matching subset with the geometric representation of the input symbol and identifies the geometric model or models that most closely match the geometric representation of the input symbol.

2. The handwriting recognizer of claim 1 wherein the symbol analyzer is adapted to translate the coordinate information for each written feature into a feature code representing one of thirteen feature models.

3. The handwriting recognizer of claim 1 wherein the symbol analyzer includes means for vectorizing the coordinate information into a time sequence of vector codes representing vector information of the features.

4. The handwriting recognizer of claim 3 wherein the symbol analyzer includes a filter adapted to smooth anomalous vector codes.

5. The handwriting recognizer of claim 3 wherein the symbol analyzer includes means for translating a portion of the vector codes into one of the feature codes.

6. The handwriting recognizer of claim 1 wherein the symbol analyzer includes a hook filter adapted to determine whether an end portion of a pen stroke is intended to be part of a feature or an unintended hook.

7. The handwriting recognizer of claim 6 wherein the symbol analyzer includes means for vectorizing the coordinate information into a plurality of vector codes representing vector information of the features and wherein the hook filter is adapted to identify an unintended hook if the number of vector codes created for the end portion of the pen stroke is less than a predetermined fraction of the number of vector codes created for the entire pen stroke.

8. The handwriting recognizer of claim 1 wherein the symbol analyzer includes means for creating the geometric representation of the input symbol by saving a subset of the coordinate points of each feature and discarding the remaining coordinate points of the features.

9. The handwriting recognizer of claim 8 wherein the subset saved is limited to two coordinate points for each feature with one of the two coordinate points being an end point of the feature.

10. The handwriting recognizer of claim 1 wherein the label comparator includes:

means for rearranging the order of the feature codes of the input label after the geometric representation of the input symbol corresponding to the input label is compared by the geometric comparator and for comparing the rearranged input label to the label models.

11. The handwriting recognizer of claim 1 wherein the label comparator includes means for comparing the input label only with label models having the same number of feature codes as the input label during a first pass.

12. The handwriting recognizer of claim 1 wherein the label comparator includes means for identifying a score for each comparison of the input label with one of the label models and means for saving the scores that satisfy a predetermined label threshold.

13. The handwriting recognizer of claim 1 wherein the geometric comparator includes means for computing a Euclidean vector distance for each geometric model, the Euclidean vector distance representing how closely the geometric model matches the geometric representation of the input symbol.

14. The handwriting recognizer of claim 13 wherein the geometric representation of the input symbol is limited to two coordinate points for each feature and the means for computing a Euclidean vector distance computes the Euclidean vector distance for a selected geometric model by determining a distance between each of the two coordinates points for each feature and corresponding coordinate points for the selected geometric model.

15. The handwriting recognizer of claim 13, further including output means for causing to be displayed one of the geometric models whose Euclidean vector distance satisfies a geometric threshold.

16. An automatic handwritten symbol recognizer that recognizes a handwritten input symbol having sequential features written according to a time sequential order, comprising:

a symbol analyzer that receives a time sequence of coordinate information representing the sequential features of the input symbol according to the time sequential order in which the sequential features were written, translates the coordinate information for each written sequential feature into a feature code representing one of a predetermined number of feature models, and produces an input label of feature codes ordered according to the time sequential order in which the features were written, the symbol analyzer also creates a geometric representation of the input symbol;

a memory storing reference symbol information including a plurality of label models and a plurality of geometric models, each label model including a plurality of feature codes in a predetermined order and corresponding to one of the geometric models;

a label comparator that compares the input label with the label models and identifies the label model or models that most closely match the input label, wherein the label comparator includes means for comparing the input label only with label models having the same number of feature codes as the input label during a first pass and wherein the label comparator includes means for comparing the input label with label models having one more or one less feature code than the input label during a second pass; and a geometric comparator that compares the geometric models corresponding to the label models most closely matching the input label with the geometric representation of the input symbol and identifies the geometric model or models that most closely match the geometric representation of the input symbol.

17. A computerized method of recognizing a handwritten input symbol having features written according to a time sequential order, comprising:

receiving a time sequence of coordinate information representative of the input symbol;

translating the coordinate information into an input label of one or more feature codes ordered according to the time sequential order of the features, each feature code representing one of a predetermined number of feature models;

comparing the input label to a plurality of stored label models without regard for positions of the features represented by the feature codes of the input label, each label model corresponding to a stored geometric model and including a defined sequence of feature codes that are compared to the input label according to the time sequential order in which the features of the input symbol were written, each geometric model including data representing positions of features of a reference symbol represented by the geometric model;

identifying a most closely matching subset of the stored label models by identifying the label model or models most closely matching the input label regardless of the positions of the features represented by the feature codes of the input label;

creating a geometric representation of the input symbol, the geometric representation including data representing positions of features of the input symbol;

comparing only the geometric models corresponding to the label models of the most closely matching subset with the geometric representation of the input symbol; and identifying the geometric model or models that most closely match the input symbol geometric representation.

18. The method of claim 17 wherein the translating step includes translating the coordinate information for each written feature into a feature code representing one of thirteen feature models.

19. The method of claim 17 wherein the translating step includes vectorizing the coordinate information into a time sequence of vector codes representing vector information of the features.

20. The method of claim 19 wherein the translating step includes smoothing anomalous vector codes.

21. The method of claim 19 wherein the translating step includes translating a portion of the vector codes into one of the feature codes.

22. The method of claim 17 wherein the translating step includes determining whether an end portion of a pen stroke is intended to be part of a feature or an unintended hook and ignoring the end portion if it is determined to be an unintended hook.

23. The method of claim 22 wherein the determining step includes:

vectorizing the coordinate information into a plurality of vector codes representing vector information of the features; and identifying an unintended hook if the number of vector codes created for the end portion of the pen stroke is less than a predetermined fraction of the number of vector codes created for the entire pen stroke.

24. The method of claim 17 wherein the translating step includes saving a subset of the coordinate points of a feature and discarding the remaining coordinate points of the feature.

25. The method of claim 24, further including limiting the subset saved to two coordinate points, one of the two coordinate points being an end point of the feature.

26. The method of claim 17 wherein the translating step includes:

rearranging the order of the feature codes of the input label after the input symbol geometric representation corresponding to the input label is compared to the geometric models; and comparing the rearranged input label to the label models.

27. The method of claim 17 wherein the comparing labels step includes comparing the input label only with label models having the same number of feature codes as the input label during a first pass.

28. The method of claim 17 wherein the comparing labels step includes identifying a score for each comparison of the input label with one of the label models and saving the scores that satisfy a predetermined label threshold.

29. The method of claim 17 wherein the geometric comparing step includes computing a Euclidean vector distance for each geometric model, the Euclidean vector distance representing how closely the geometric model matches the geometric representation of the input symbol.

30. The method of claim 29 wherein the geometric representation created is limited to exactly two coordinate points for each feature and the step of computing a Euclidean vector distance includes computing the Euclidean vector distance for a selected geometric model by determining a distance between each of the two coordinates points for each feature and corresponding coordinate points for the selected geometric model.

31. The method of claim 30, further including displaying one of the geometric models whose Euclidean vector distance satisfies the geometric threshold.

32. A computerized method of recognizing a handwritten input symbol having features written according to a time sequential order, comprising:

receiving a time sequence of coordinate information representative of the input symbol;

translating the coordinate information into an input label of one or more feature codes ordered according to the time sequential order of the features, each feature code representing one of a predetermined number of feature models;

comparing the input label to a plurality of stored label models having the same number of feature codes as the input label during a first pass, each label model corresponding to a stored geometric model and including a defined sequence of feature codes that are compared to the input label according to the time sequential order in which the features of the input symbol were written, wherein the comparing labels step includes comparing the input label with label models having one more or one less feature code during a second pass;

identifying the label model or models most closely matching the input label;

creating a geometric representation of the input symbol;

comparing the geometric models corresponding to the most closely matching label models with the geometric representation of the input symbol; and identifying the geometric model or models that most closely match the input symbol geometric representation.

33. A computerized method of recognizing a handwritten input symbol having features written according to a time sequential order, comprising:

receiving a time sequence of coordinate information representative of the input symbol;

vectorizing the coordinate information into a plurality of vector codes each of which represents a direction taken while the input symbol was being handwritten;

translating the vector codes into an input label of one or more feature codes ordered according to the time sequential order in which the features were written, each feature code representing one of a predetermined number of feature models;

comparing the input label to a plurality of stored label models having the same number of feature codes as the input label during a first pass and comparing the input label with label models having one more or one less feature code during a second pass, each label model corresponding to a geometric model of a written symbol; and identifying the input label model or models that most closely match the input label.

34. The method of claim 33, wherein the vectorizing step includes:

determining a direction traveled from a first point to a second point as the input symbol is being handwritten;

translating the direction into one of a plurality of vector codes;

repeating the steps of determining a direction and translating the direction for a plurality of first points and a plurality of second points to create the plurality of vector codes for the input symbol.

35. The method of claim 33, further including determining whether an end portion of a pen stroke is intended to be part of a feature or an unintended hook and ignoring the end portion if it is determined to be an unintended hook.

36. The method of claim 35 wherein the determining step includes:

identifying an unintended hook if the number of vector codes created for the end portion of the pen stroke is less than a predetermined fraction of the number of vector codes created for the entire pen stroke.

37. The method of claim 33, further including:

storing a plurality of geometric models, each of which corresponding to one of the label models creating a geometric representation of the input symbol;

comparing the geometric models corresponding to the most closely matching label models with the geometric representation of the input symbol; and identifying the geometric model or models that most closely match the geometric representation of the input symbol.

38. The method of claim 37 wherein the geometric representation created is limited to two coordinate points for each feature and the step of computing a Euclidean vector distance includes computing the Euclidean vector distance for a selected geometric model by determining a distance between each of the two coordinates points for each feature and corresponding coordinate points for the selected geometric model.

39. An automatic handwritten symbol recognizer that recognizes a handwritten input symbol having features written according to a time sequential order, comprising:

a symbol analyzer that receives a time sequence of coordinate information representing the features of the input symbol and translates the coordinate information for each feature into a feature code representing one of a predetermined number of feature models, the symbol analyzer also creates a geometric representation of the input symbol by saving a subset of the coordinate points of each feature and discarding the remaining coordinate points of the features, the subset saved including an end point of the feature;

a memory storing reference symbol information including a plurality of label models and a plurality of geometric models, each label model including a predetermined sequence of feature codes and corresponding to one of the geometric models;

a label comparator that compares sequentially the feature codes of the input symbol with the feature codes of the label models according to the time sequential order in which the features of the input symbol were handwritten and identifies the label model or models whose feature codes most closely match the feature codes of the input symbol; and a geometric comparator that compares geometric models corresponding to the label models whose feature codes most closely match the feature codes of the input symbol with a geometric representation of the input symbol and identifies the geometric model or models that most closely match the geometric representation of the input symbol.

40. The handwriting recognizer of claim 39 wherein the symbol analyzer is adapted to translate the coordinate information for each feature into a feature code representing one of thirteen feature models.

41. The handwriting recognizer of claim 39 wherein the symbol analyzer includes means for vectorizing the coordinate information into a plurality of vector codes representing vector information of the features.

42. The handwriting recognizer of claim 41 wherein the symbol analyzer includes a filter adapted to smooth anomalous vector codes.

43. The handwriting recognizer of claim 41 wherein the symbol analyzer includes means for translating a portion of the vector codes into one of the feature codes.

44. The handwriting recognizer of claim 39 wherein the symbol analyzer includes a hook filter adapted to determine whether an end portion of a pen stroke is intended to be part of a feature or an unintended hook.

45. The handwriting recognizer of claim 39 wherein the symbol analyzer includes means for arranging the feature codes of the input label according to the sequential order in which the coordinate information corresponding to the feature codes was produced.

46. The handwriting recognizer of claim 45 wherein the label comparator includes:

means for rearranging the order of the feature codes of the input label after the geometric representation of the input symbol corresponding to the input label is compared by the geometric comparator; and means for comparing the rearranged input labels to the label models.

47. The handwriting recognizer of claim 39 wherein the label comparator includes means for comparing the input label only with label models having the same number of feature codes as the input label during a first pass.

48. The handwriting recognizer of claim 39 wherein the label comparator includes means for identifying a score for each comparison of the input label with one of the label models and means for saving the scores that satisfy a predetermined label threshold.

49. The handwriting recognizer of claim 39 wherein the geometric comparator includes means for computing a Euclidean vector distance for each geometric model, the Euclidean vector distance representing how closely the geometric model matches the geometric representation of the input symbol.

50. The handwriting recognizer of claim 49 wherein the geometric representation of the input symbol is limited to exactly two coordinate points for each feature and the means for computing a Euclidean vector distance computes the Euclidean vector distance for a selected geometric model by determining a distance between each of the two coordinates points for each feature and a corresponding coordinate point for the selected geometric model.

51. The handwriting recognizer of claim 49, further including output means for causing to be displayed one of the geometric models whose Euclidean vector distance satisfies a geometric threshold.

52. A computer-readable storage medium for controlling a computer to recognize a handwritten input symbol having features written according to a time sequential order, comprising:

computer instructions for receiving a time sequence of coordinate information representing the Features of the input symbol;

computer instructions for translating the coordinate information for each feature into a feature code representing one of a predetermined number of feature models;

reference symbol information including a plurality of label models and a plurality of geometric models, each label model including a predetermined sequence of feature codes and corresponding to one of the geometric models;

computer instructions for comparing sequentially the feature codes of the input symbol with the feature codes of the label models according to the time sequential order in which the features of the input symbol were handwritten and identifies the label model or models whose feature codes most closely match the feature codes of the input symbol; and computer instructions for comparing geometric models corresponding to the label models whose feature codes most closely match the feature codes of the input symbol with a geometric representation of the input symbol and identifies the geometric model or models that most closely match the geometric representation of the input symbol; and wherein the computer instructions for comparing the feature codes with the label models include computer instructions for comparing the input label with label models having one more or one less feature code than the input label during a second pass.

53. A computer-readable storage medium including executable instructions for controlling a computer to recognize a handwritten input symbol having features written according to a time sequential order, the executable instructions comprising instructions for:

receiving a time sequence of coordinate information representative of the input symbol;

translating the coordinate information into an input label of one or more feature codes ordered according to the time sequential order of the features, each feature code representing one of a predetermined number of feature models;

comparing the input label to a plurality of stored label models without regard for positions of the features represented by the feature codes of the input label, each label model corresponding to a stored geometric model and including a defined sequence of feature codes that are compared to the input label according to the time sequential order in which the features of the input symbol were written, each geometric model including data representing positions of features of a reference symbol represented by the geometric model;

identifying a most closely matching subset of the stored label models by identifying the label model or models most closely matching the input label regardless of the positions of the features represented by the feature codes of the input label;

creating a geometric representation of the input symbol, the geometric representation including data representing positions of features of the input symbol;

comparing only the geometric models corresponding to the label models of the most closely matching subset with the geometric representation of the input symbol; and identifying the geometric model or models that most closely match the input symbol geometric representation.

54. The storage medium of claim 53 wherein the instructions for translating the coordinate information include instructions for vectorizing the coordinate information into a time sequence of vector codes representing vector information of the features and translating the vector codes for each written feature into a feature code representing one of thirteen feature models.

55. The storage medium of claim 53 wherein the instructions for translating the coordinate information include instructions for determining whether an end portion of a pen stroke is intended to be part of a feature or an unintended hook by identifying an unintended hook if the number of vector codes created for the end portion of the pen stroke is less than a predetermined fraction of the number of vector codes created for the entire pen stroke and ignoring the end portion if it is determined to be an unintended hook.

56. The storage medium of claim 53 wherein the instructions for creating a geometric representation include instructions for limiting the geometric representation to exactly two coordinate points for each feature and the instructions for comparing only the geometric models include instructions for computing a Euclidean vector distance for each geometric model corresponding to one of the label models of the most closely matching subset by determining a distance between each of the two coordinates points for each feature and corresponding coordinate points for the geometric model, the Euclidean vector distance representing how closely the geometric model matches the geometric representation of the input symbol.

57. The storage medium of claim 53 wherein the instructions for translating the coordinate information include instructions for:

rearranging the order of the feature codes of the input label after the input symbol geometric representation corresponding to the input label is compared to the geometric models; and comparing the rearranged input label to the label models.

58. A computer-readable storage medium including executable instructions for controlling a computer to recognize a handwritten input symbol having features written according to a time sequential order, the executable instructions comprising instructions for:

receiving a time sequence of coordinate information representing the features of the input symbol;

translating the coordinate information for each feature into a feature code representing one of a predetermined number of feature models;

creating a geometric representation of the input symbol by saving a subset of the coordinate points of each feature and discarding the remaining coordinate points of the features, the subset saved including an end point of the feature;

storing reference symbol information including a plurality of label models and a plurality of geometric models, each label model including a predetermined sequence of feature codes and corresponding to one of the geometric models, comparing sequentially the feature codes of the input symbol with the feature codes of the label models according to the time sequential order in which the features of the input symbol were handwritten, identifying the label model or models whose feature codes most closely match the feature codes of the input symbol;

comparing geometric models corresponding to the label models whose feature codes most closely match the feature codes of the input symbol with the geometric representation of the input symbol; and identifying the geometric model or models that most closely match the geometric representation of the input symbol.

59. The storage medium of claim 58 wherein the instructions for translating the coordinate information include instructions for vectorizing the coordinate information into a time sequence of vector codes representing vector information of the features and translating the vector codes for each written feature into a feature code representing one of thirteen feature models.

60. The storage medium of claim 58 wherein the instructions for translating the coordinate information include instructions for determining whether an end portion of a pen stroke is intended to be part of a feature or an unintended hook by identifying an unintended hook if the number of vector codes created for the end portion of the pen stroke is less than a predetermined fraction of the number of vector codes created for the entire pen stroke and ignoring the end portion if it is determined to be an unintended hook.

61. The storage medium of claim 58 wherein the instructions for translating the coordinate information include instructions for:

rearranging the order of the feature codes of the input label after the input symbol geometric representation corresponding to the input label is compared to the geometric models; and comparing the rearranged input label to the label models.

* * * * *